United States Patent [19]

Ishikawa

[11] Patent Number: 4,959,671

[45] Date of Patent: Sep. 25, 1990

[54] VERTICAL TILTING APPARATUS OF TRIPOD HEAD

[75] Inventor: Masao Ishikawa, Yashio, Japan

[73] Assignee: Heiwa Seiki Kogyo Co., Ltd., Yashio, Japan

[21] Appl. No.: 308,085

[22] Filed: Feb. 9, 1989

[51] Int. Cl.⁵ ............................................. G03B 29/00
[52] U.S. Cl. .................................... 354/81; 354/293; 248/183
[58] Field of Search ........................ 354/81, 82, 293; 352/243; 248/177, 178, 183

[56] References Cited

U.S. PATENT DOCUMENTS 1,898,469  2/1933  Tonsor ............................ 352/243 X
3,552,699  1/1971  Baker ................................... 248/183

Primary Examiner—Brian W. Brown
Attorney, Agent, or Firm—Armstrong, Nikaido, Marmelstein, Kubovcik & Murray

[57] ABSTRACT

A vertical tilting apparatus of a tripod head for a camera or the like is disclosed. The vertical tilting apparatus includes a torque changeover mechanism. The structure of the torque changeover mechanism comprises a disk-shaped first unit, a second unit, a unit securing pin and a second unit case on the second unit. The first unit consists of many first damp adjusting plates and first intermediate bodies. The second unit consists of ring-shaped intermediate bodies opposite to the surfaces of the first intermediate bodies, a viscous fluid therebetween and second damp adjusting bodies. The first unit and the second unit arranged concentrically. The unit arc securing pin can be releasably inserted into any of holes provided on the circumferential surface of the second unit case for use.

4 Claims, 4 Drawing Sheets

VERTICAL TILTING APPARATUS OF TRIPOD HEAD

FIELD OF THE INVENTION

The present invention relates to a vertical tilting apparatus of a tripod head for a camera or the like.

DESCRIPTION OF PRIOR ART

The conventionally known vertical tilting apparatuses to be fitted to a tripod head are defective in that the balance of coil springs arranged on both sides cannot be altered or adjusted.

Particularly, in an apparatus of the type adapted to a camera having the center of gravity thereof located in the front portion. For example the rear portion of the apparatus becomes too low for a camera having the center of gravity thereof located in the rear portion. In an apparatus of the type adapted to a camera having the center of gravity thereof located in the rear portion thereof, the front portion of the apparatus becomes too low for a camera having the center of gravity located in the front portion.

To solve this defect in the prior art, a vertical tillting apparatus of a tripod head has previously been proposed comprising a horizontal shaft provided on a support arranged through a horizontal swiveling apparatus on a fitting base to a tripod or the like; a securing disk for a camera or the like provided across the top portions of a pair of right and left leg members bearing-supported rotatably in the forward and back directions; a pair of right and left coil springs between leg members and a support having an elastic force stronger than the approximated weight of a prescribed camera or the like to be mounted on the securing disk so that the elastic force thereof acts in the opposite direction to the approximate weight, and that the securing disk for the camera or the like keeps the horizontal state when the elastic force of both springs is in balance with said prescribed camera or the like as mounted. The vertical tilting apparatus comprises directly or indirectly a plurality of engaging hubs arranged along a circle around the horizontal shaft as the center on the support side, and an engaging latch engaging or disengaging selectively with any of said plurality of engaging hubs through operation of a knob on the leg member side (Provisional Publication No. 104,894/86 of Japan Utility Model).

However, this vertical tilting apparatus having excellent functions still have several points to be improved, such as the necessity of further simplifying operations and achieving a more satisfactory torque balance by smoothing vertical tilting movement.

SUMMARY OF THE INVENTION

To solve the above-mentioned problems, an object of the present invention is to provide a vertical tilting apparatus for a tripod head which comprises a securing disk for a camera or the like keeping the horizontal state thereof when the elastic force of elastic bodies provided the right and left ends of a horizontal shaft is in balance with a camera or the like in the mounted state. The vertical tilting apparatus comprises a first unit consisting of a disk-shaped body of a plurality of first damp adjusting plates and first intermediate bodies, a second unit consisting of ring-shaped second intermediate bodies arranged opposite to the surfaces of the first intermediate bodies, a viscous fluid sealed therebetween, and a plurality of second damp adjusting plates arranged between the circumferential surfaces of the second intermediate bodies; said second unit being arranged concentrically with said first unit by means of clamping rings fitted on the horizontal shaft, and a torque changeover mechanism comprising a unit securing pin releasably engaging with a hole provided on the circumferential surface of the second unit case.

DETAILED DESCRIPTION OF THE INVENTION

The present invention therefore provides an improvement over a previously proposed vertical tilting apparatus. The present invention is described in detail below with reference to the drawings.

Figure 1:
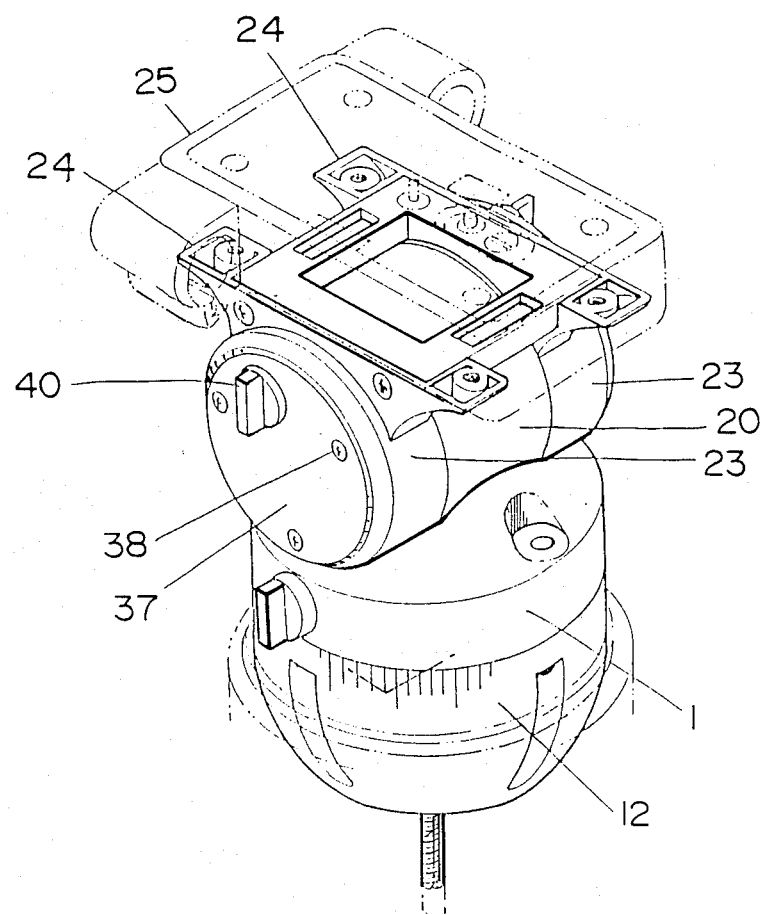
FIGS. 1 and 2 are a perspective view and a longitudinal sectional view illustrating a conventional vertical tilting apparatus of a tripod head as in the prior art related to the present invention.
Figure 2:
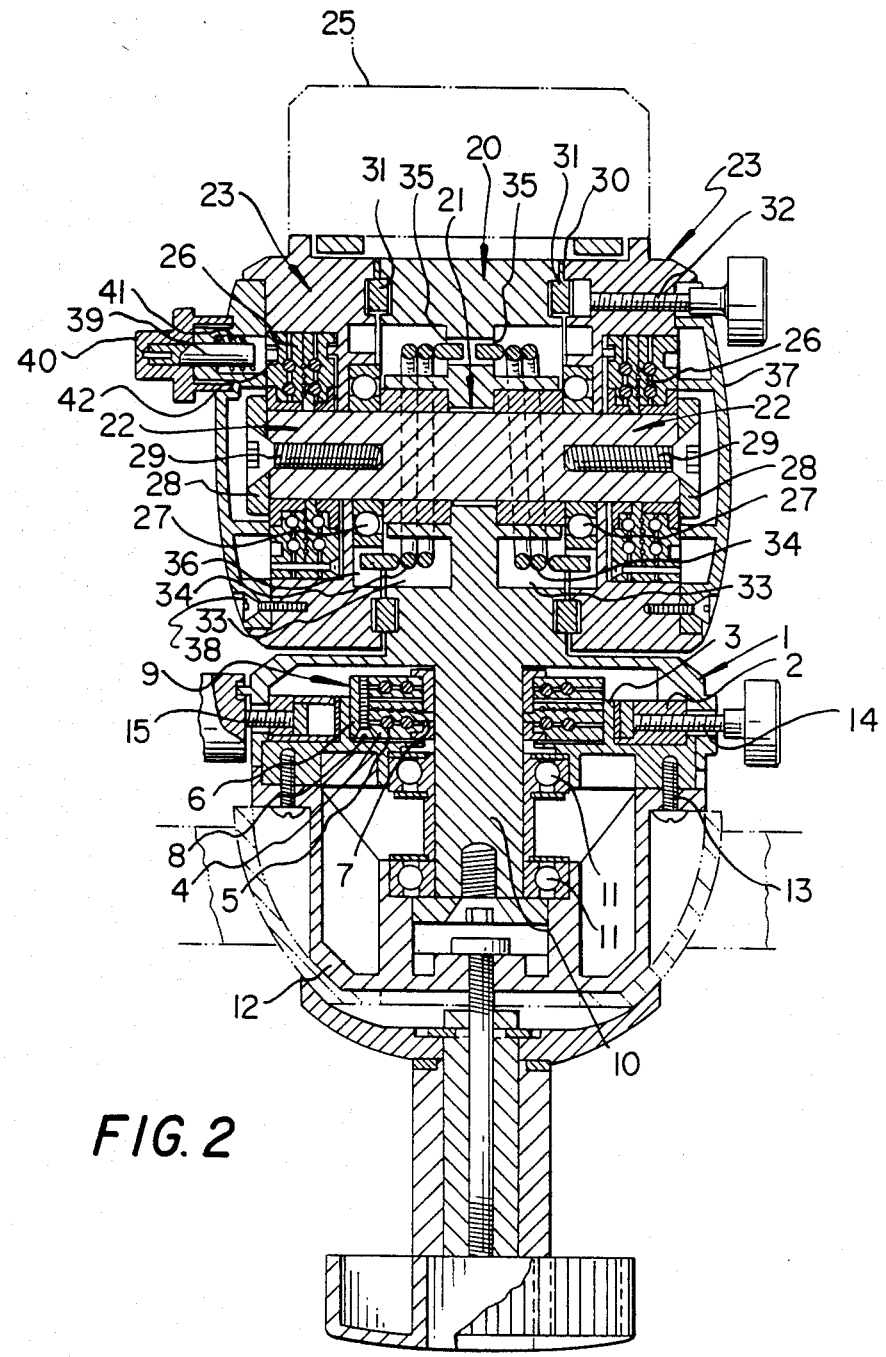

In the previously proposed vertical tilting apparatus, as shown in FIGS. 1 and 2 for example, a pan ring (2) is unrotatably fitted to the lower surface portion of a horizontal rotating body (1), and a pan adjuster (3) is rotatably engaged into the inner bore of the pan ring (2). A first oil ring bearing unit (9) comprising a doughnut-shaped fitting strip (4), an o-ring made of an oil-resistant rubber (5), an oil shield ring (6), a member for forming shaft hole (7) and a clamp screw (8) is unrotatably fitted to the upper surface of the pan adjuster (3).

A downward center shaft (10) is provided in projection, and rotatably inserted into the shaft hole of the first oil ring bearing unit (9) so that the leading end of the center shaft (10) projects from the lower surface of the pan adjuster (3). A pair of ball bearings (11) are engaged with the uppermost and the lowermost positions of the projection. A hollow hemispheric base (12) is secured by means of a screw (13) to the lower surface of the pan adjuster (3). The horizontal rotating body (1) is horizontally rotatably bearing-connected onto the base (12) with the lower surface thereof as a spherical journal.

Full stoppage and full release of horizontal rotation of the horizontal rotating body (1) can be accomplished through tightening and loosening of a screw stock (14). The function of providing semi-damping of a prescribed intensity can be performed for the horizontal rotation of the horizontal rotating body (1) through tightening and releasing of a screw stock (15).

A horizontal shaft is unrotatably inserted into a horizontal hole (21) pierced through an upward support (20) on the upper surface of the above-mentioned horizontal rotating body (1). A pair of T-shaped leg members (23) are arranged on both sides of the support (20). Bearing holes are provided in the lower end portions of these leg members (23), which are engaged rotatably to the horizontal shaft (22) in the forward and back directions.

A securing disk (25) for camera or the like is provided across the space between horizontal members (24) by means of screws. A second oil ring bearing unit (26) having the same structure as the above-mentioned first oil ring bearing unit (9) is unrotatably engaged around the leading end of the horizontal shaft (22) both on the inner and on the outer sides of each of a right and a left leg members (23). By attaching it to a ball bearing (27), an arresting plate (28) and a set screw (29), it supports the leg members (23) movably in the forward and back directions. A doughnut-shaped space is formed by cutting grooves (30) opening one opposite to another on the desired positions of a circle with the above-mentioned horizontal shaft (22) as the center on the inner sides of the right and left leg members (23) and on the both sides of the support (20). A pair of tilt adjusting rings (31) having washer-like play strips contacted with both their sides is inserted into this space. For one of the tilt adjusting rings (31), a tilt securing screw (32) with a knob engages with and disengages from a screw hole pierced in one of the leg members (23) to conduct and release pressure contact.

A recess (33) opening is horizontally cut around the horizontal shaft (22) the both sides of the support (20). A pair of right and left coil springs (34) having an elastic force stronger than the approximate weight of the camera or the like to be mounted on the above-mentioned securing disk (25) are wound around the horizontal shaft (22) in the recess (33) so that the elastic force acts in the opposite direction each other. The inner ends of these coil springs (34) are engaged with engaging holes (35) pierced in the bottom surface of the recess (33), and the outer ends thereof are engaged with engaging holes (36) pierced in the inner surface of the leg members (23). The positions of these engaging holes (35) and (36) are such that the securing disk (25) not mounting a camera or the like keeps the horizontal state by the balance of elastic force of the respective coil springs (34).

Covering bodies (37) are arranged outside the above-mentioned arresting plate (28), and the outer circumferences of these covering bodies (37) are secured to the leg members (23) by means of screws (38). A through-hole is provided on the outer circumference of one of the covering bodies (37), through which a pin (39) is slidably inserted. A flange is provided at a position near the inner end of this pin (39) to prevent the pin from coming off. An operating knob (40) is unrotatbly fixed to the outer end of the pin (39) by means of a screw. A cam unit is provided, which causes the pin (39) to move inside and to outside under the effect of a spring (41).

A plurality of recesses (42) are provided at prescribed intervals along a circle containing points corresponding to the inner end of the pin (39) on the outer side of the second oil ring bearing unit (26) so that the inner end of the above-mentioned pin (39) is selectively engaged with and disengaged from one of these recesses (42) by positively or negatively turning the operating knob (40).

The invention covered by the present application provides a further improvement over the vertical tilting apparatus of a tripod head having the detailed structure as described above, for the purpose of achieving easier operation and permitting proper adjustment of the torque balance. The improvement proposed by the present invention relates to the second oil ring bearing unit (26) of the above-mentioned structure comprising the provision of a torque changeover mechanism of the following structure for the horizontal shaft (22).

The improvement is characterized by the torque changeover mechanism in which a first unit comprising a disk-shaped plate body consisting of a plurality of first damp adjusting plates and first intermediate bodies and a second unit comprising ring-shaped second intermediate bodies opposite the surface of the first intermediate bodies, a viscous fluid sealed in between, and second damp adjusting plates provided between the circumferential surfaces of the second intermediate bodies. The first and second units are arranged concentrically on the horizontal shaft by means of clamping rings, and a unit securing pin is releasably inserted into a hole provided on the circumferential surface of the second unit case.

Figure 3:
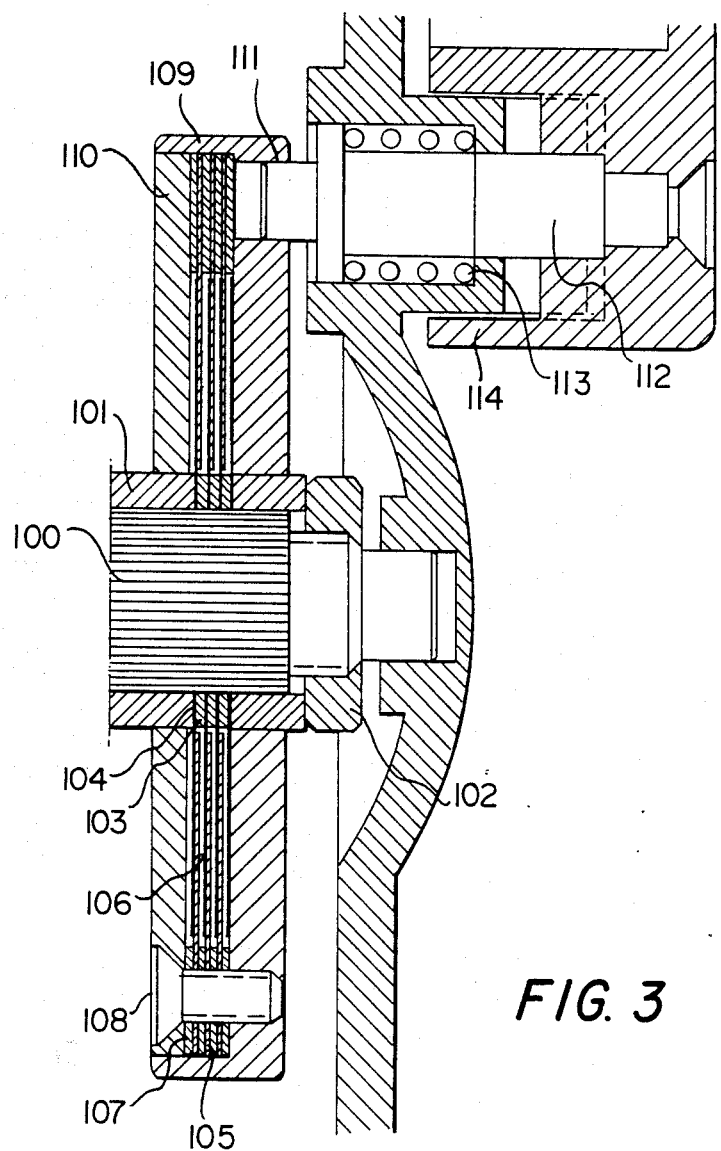
FIGS. 3 and 4 are a partial longitudinal sectional view and a partial perspective view illustrating an embodiment of the torque changeover mechanism of the present invention.

Typical features of this torque changeover mechanism is illustrated in FIG. 3.

In the torque changeover mechanism, as shown in FIG. 3, the first unit comprises a disk-shaped plate body consiting of the first damp adjusting plates (103) and the first intermediate bodies (104) clamped to the horizontal shaft (100) of a tripod head by means of a clamping ring (101) and a clamping nut (102).

The respective first intermediate bodies (104) have diameters larger than that of the clamping ring (101) and the circumferential surfaces thereof reach even the interior of the second unit separated from the above-mentioned first unit. More specifically, the second unit comprises the ring-shaped second intermediate bodies (105) opposite to the surfaces of the first intermediate bodies (104), the viscous fluid (106), such as viscous grease, sealed in between, and the second damp adjusting plates (107) provided on the circumferential surfaces of the second intermediate bodies (105) arranged concentrically with the first unit. The second damp adjusting plates (107) and the second intermediate bodies (105) are housed in a second unit case (109) by clamping them between the second unit case (109) and a second unit cap (110) by means of clamp screws (108).

The second unit is tiltable in the forward and back directions relative to the first unit. Adjustment of torque balance in this case is accomplished by selecting any of a plurality of holes (111) provided on the circumferential surface of the second unit case (109) and inserting a securing pin (112) in a desired hole (111). This securing pin (112) is releasably inserted into a hole (111) by means of a switching knob (114) via spring (113).

Figure 4:
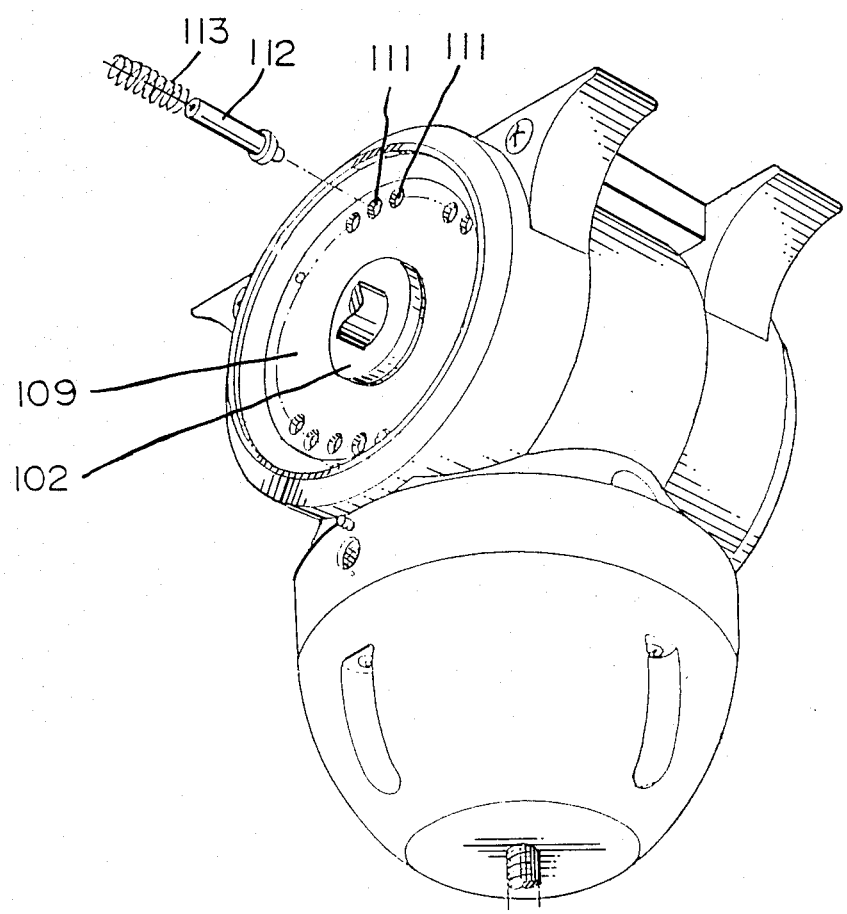

The relationship between this hole (111) and the securing pin (112) is illustrated in FIG. 4.

In the embodiment with the structure as described above of the present invention, torque adjustment of vertical tilting of the tripod head is accomplished through shear tilting balance between the first intermediate bodies (104) and the second intermediate bodies (105) in the second unit containing the viscous fluid (106) sealed therein.

Under the effect of this mechanism, vertical tilting in the forward and back directions of a camera or the like on the tripod head can have an excellent torque balance.

It is needless to mention that a horizontal swiveling mechanism or the like may be combined with the present invention as in the prior art, and various manners may be adopted for the other individual mechanisms.

What is claimed is:

1. A torque changeover mechanism for a vertical tilting apparatus of a tripod head which incorporates a securing disk that maintains the horizontal state of a camera mounted thereon in balance with elastic bodies acting in opposition to each other at right and left ends of a horizontal shaft in the vertical tilting apparatus, said torque changeover mechanism comprising:
    a first unit incorporating the horizontal shaft and having a plurality of first damp adjusting plates and first intermediate bodies wherein the first change adjusting plates and the first intermediate bodies are concentrically and alternatingly arranged with each other along the longitudinal axis of the shaft, the first damp adjusting plates and the first intermediate bodies being securely fit with the shaft;

a second unit having ring-shaped second intermediate bodies and second damp adjusting plates wherein the second intermediate bodies and second damp adjusting plates are concentrically and alternatingly arranged with each other relative to the longitudinal axis of the shaft, said first unit being inter-engaged with said second unit such that each first damp adjusting plate is co-axially positioned with a corresponding second intermediate body along a first plane and each first intermediate body is co-axially positioned with a corresponding second damp adjusting plate along a second plane;

a unit case for holding and sealing therein said inter-engaged first and second units, said second unit being securely fit in said unit case and said unit case having a plurality of securing holes defined along a radius on a surface of said unit case;

a unit securing pin releasably insertable into any of the securing holes on said unit case for securing said first and second units to allow torque balance adjustment; and viscous fluid filled into said unit case and between said inter-engaged first and second units.

2. The torque changeover mechanism as claimed in claim 1, wherein said unit securing pin is provided with a spring for holding said securing pin in the securing holes and a torque unit changeover knob attached to said securing pin to allow handling of said securing pin.

3. The torque changeover mechanism as claimed in claim 1, wherein a support for the vertical tilting apparatus is provided on a fitting base of the tripod head for connection to a tripod through a horizontal swiveling apparatus in the tripod head, and the horizontal shaft of the first unit is bearing-supported on said support.

4. The torque changeover mechanism as claimed in claim 1, wherein the horizontal shaft is bearing-supported on a support cap in the tripod head through a first unit clamping nut.

* * * * *